United States Patent [19]

Glover

[11] 4,072,440

[45] Feb. 7, 1978

[54] GUIDE ATTACHMENT FOR PORTABLE POWER DRILLS

[76] Inventor: Robert L. Glover, P.O. Box 335, Ash Fork, Ariz. 86320

[21] Appl. No.: 776,713

[22] Filed: Mar. 11, 1977

[51] Int. Cl.[2] .............................................. B23B 45/14

[52] U.S. Cl. ..................................................... 408/112

[58] Field of Search ........................ 408/14, 88, 95, 96, 408/97, 98, 99, 110, 111, 112

[56] References Cited

U.S. PATENT DOCUMENTS

| | | | |
|---|---|---|---|
| 2,430,812 | 11/1947 | Goldberg | 408/112 |
| 2,680,435 | 6/1954 | Gonzalez | 408/110 X |
| 2,837,939 | 6/1958 | Leitner et al. | 408/110 |
| 2,997,900 | 8/1961 | Pugsley | 408/95 |
| 3,746,460 | 7/1973 | Lipe | 408/112 |
| 3,874,810 | 4/1975 | Russell | 408/14 |

*Primary Examiner*—Travis S. McGehee
*Attorney, Agent, or Firm*—Shanley, O'Neil and Baker

[57] ABSTRACT

A reliable, inexpensive drill attachment for positioning a portable power drill relative to an article to be drilled includes adjustable means for aligning the attachment relative to the axis of the drill and an improved base for supporting the drill to accurately align and hold the drill axis in a normal position relative to a flat surface to be drilled or to a cylindrical or compound curved surface such as a spherical surface. A plurality of feet are positioned at various locations on the base to enable the attachment to adapt to various surfaces.

12 Claims, 8 Drawing Figures

90
72
16
14
18
20
96
4.
42
32
56
50
54
58
26
28
5.
34
12
30
24
92
94

GUIDE ATTACHMENT FOR PORTABLE POWER DRILLS

BACKGROUND OF THE INVENTION

1. Field of the Invention

This invention relates to drill guides and more particularly to a drill guide assembly releasably attachable to a portable power drill for accurately positioning and guiding the drill relative to a workpiece.

2. Description of the Prior Art

It is extremely difficult to maintain a conventional hand-held portable electric drill in the precise orientation desired during a drilling operation due in part to the lack of symmetry of the drill structure, and in part to the fact that such devices do not include any convenient way of sighting along or parallel to the drill axis. For example, when it is desired to drill a hole normal to a flat surface with such a tool, it is normally necessary to try to visually align the relatively short drill bit perpendicular to the workpiece by sighting the drill bit from various positions around the drill and thereafter to try to maintain the assembly in the sighted position while applying pressure to the off-set pistol grip handle of the housing. Difficulty is also encountered in drilling holes perpendicular to a cylindrical surface or to a compound curved surface, and in drilling holes precisely on the centerline and perpendicular to relatively narrow flat surfaces.

In an effort to overcome the difficulties in using hand-held power drills, numerous prior art devices have been developed to orient the drill relative to the surface of the workpiece. However, these prior art devices have not always been successful, and generally have not met wide-spread acceptance for various reasons. For example, many of the prior art devices have been designed for use only with specific drill structures, or have required some modifications of the drill structure for attachment thereto, and therefore have not been readily useable with the numerous existing makes and models of drills. Further, some prior art devices have been prohibitively expensive for use as an attachment for a relatively inexpensive drill of the type frequently purchased by homeowners or small shops.

It is the primary object of the present invention, therefore, to provide a drill guide which is quickly and easily mounted on most conventional, commercial hand-held power drills, and which will reliably and accurately support the drill for drilling holes normal to a workpiece surface.

Another object of the invention is to provide a lightweight, reliable, easy-to-use, and inexpensive drill guide which may be used with commercial hand drills without modification of the drill structure.

SUMMARY OF THE INVENTION

The foregoing and other objects and advantages of the present invention are attained in a drill guide assembly including a saddle structure adapted to be releasably mounted on the drill motor housing by a conventional strap clamp. A plurality of screw-adjustable contact pads are carried by the saddle assembly for contacting the drill motor housing, with the screw adjustments permitting easy alignment of the assembly with the axis of the drill and at the same time adapting the saddle to the existing contours of the motor housing. The saddle assembly also includes an index plate, or yoke assembly, engaging the drill housing at the end thereof adjacent the drill chuck to provide additional support and stability of the drill relative to the saddle and to assist in aligning the drill and drill guide assembly.

The saddle is mounted for vertical sliding movement on a pair of parallel, laterally-spaced guide rods supported on and projecting upwardly from one edge of a base or shoe member, and coil springs mounted on the guide rods resiliently urge the saddle, and a drill supported thereon, to the raised position spaced above the shoe member. Adjustable stop means carried by the shoe and adapted to engage the saddle is provided for limiting the movement of the drill assembly toward the shoe and thereby limit the depth of the hole to be drilled.

The flat bottom surface of the base member extends in a plane perpendicular to the plane containing the axis of the guide bars, and a circular opening is provided in position to permit a drill bit, clamped in the chock of an electric drill supported by the assembly, to pass therethrough. A V-shaped groove in the bottom surface of the base extends diametrically across the circular opening on a line parallel to the plane containing the axes of the two guide rods. A plurality of openings are formed in the shoe member, from the bottom surface, for releasably receiving downwardly-projecting support feet which preferably are formed of a rubber or rubber-like high-friction material. The pattern of feet enables the assembly to be supported on a flat surface with the base extending parallel thereto, without providing interference with the V-shaped notch. The notch is employed to accurately align the drill axis perpendicular to the surface of a relatively small cylinder such as a small rod or tube. For larger cylindrical surfaces, the feet on the bottom of the base assembly may be arranged in a pattern to act as a guide, and these feet also act as a supporting guide for compound surfaces such as spherical surfaces for positioning a drill to drill holes on the centerline of a narrow flat workpiece.

BRIEF DESCRIPTION OF THE DRAWINGS

Other features and advantages of the invention will become apparent from the detailed description thereof contained hereinbelow, taken in conjunction with the drawings, in which.

DESCRIPTION OF THE PREFERRED EMBODIMENTS

Figures 1, 2:
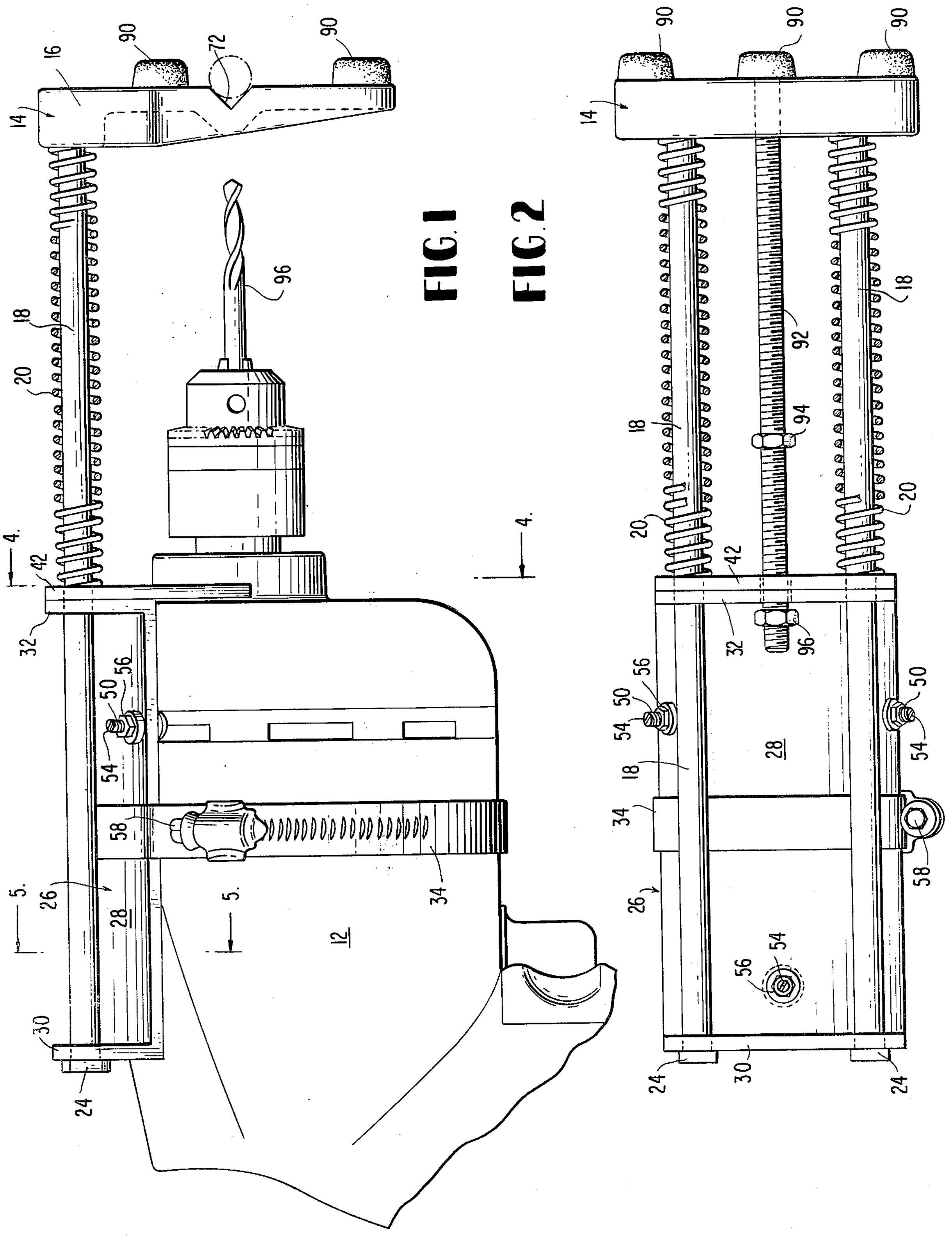
FIG. 1 is a side elevation view of the drill guide according to the present invention having a hand-held electric drill mounted thereon.
FIG. 2 is a back elevation view of the drill guide assembly.

Referring now to the drawings in detail, the drill guide assembly according to the present invention is indicated generally by the reference numeral 10 and shown in FIG. 1 as having mounted thereon a conventional, commercial hand-held portable electric drill 12. The guide assembly includes a base plate or shoe 14 having a substantially planar bottom surface 16. The shoe member 14 is preferably of a five-sided configuration, including a back or heel portion in the general form of an isoceles trapezoid and an integrally formed generally triangular front or toe portion. A pair of elongated guide rods 18 are threadably mounted on the top surface of the shoe 14, one adjacent each back corner thereof, and project upwardly therefrom in parallel relation to one another and in a plane perpendicular to the plane of surface 16. A pair of coil springs 20 are telescopingly received one on each of the guide rods 18, with the springs each having one end resting upon the top surface of the shoe 14.

A drill support assembly 22 is slidably mounted on the guide rods 18, above the springs 20, and is retained on the guide rods by enlarged heads 24 on the respective guide rods 18. Drill support 22 includes a saddle member 26 having an upwardly-extending central back plate portion 28 which is preferably arcuate in cross-section taken in a plane perpendicular to the axis of the guide rods 18, and which has a top flange 30 and a bottom flange 32 projecting rearwardly from the convex surface thereof. Aligned apertures formed in the top and bottom flanges telescopingly receive the top portion of the guide rods 18 to support and accurately guide the drill support in movement toward and away from shoe 14, with the springs 20 engaging the bottom flange 32 to normally resiliently urge the drill support away from the shoe. A steel strap clamp member 34 such as a conventional "airplane clamp" or hose clamp extends around the arcuate plate 28 between the convex rear surface and the guide rods and between the flanges 30, 32 to encircle the body or housing of drill 12 to firmly clamp the saddle onto the drill.

To assist in supporting the saddle on the drill, and in accurately aligning the drill axis in parallel relation to the guide rods 18, an index plate 42 is rigidly mounted on the bottom surface of bottom flange 32, as by screws 44. Index plate 42 projects downwardly from the arcuate member 28, providing a platform extending generally at right angles to the plane of the guide rods 18. An arcuate notch 46 cut in the outwardly extending edge of the platform section provides a yoke-like support including an arm 48 extending along each side of the drill shaft between the drill housing and the drill chuck. Engagement of this yoke with the drill housing provides both vertical and lateral support for the lower end of the drill.

Three adjusting screws 50 are threaded into apertures in the arcuate member 28, one adjacent each side edge thereof and spaced upwardly from the bottom flange 32, and the third on the vertical centerline of member 28 and spaced above the first two and cooperating therewith to provide a three-point, adjustable contact between the housing and the drill. One end of the adjusting screws 50 is covered with a resilient, rubber-like material forming an enlarged head or pad 52 for engaging the drill housing, and the opposite, threaded ends are slotted as at 54 for adjustment by a conventional screwdriver or the like. Locking nuts 56 are provided to rigidly retain the adjusting screws in position after aligning the axis of the drill with the drill guide. Conventional adjusting screw means 58 is provided for adjusting the clamp 34.

Figure 3:
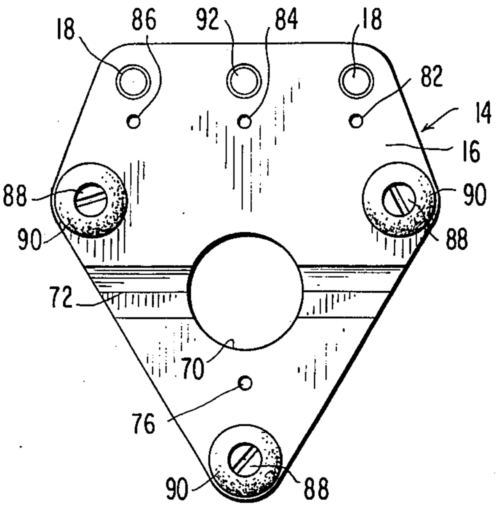
FIG. 3 is an end view showing the base of the drill guide assembly.
Figure 4:
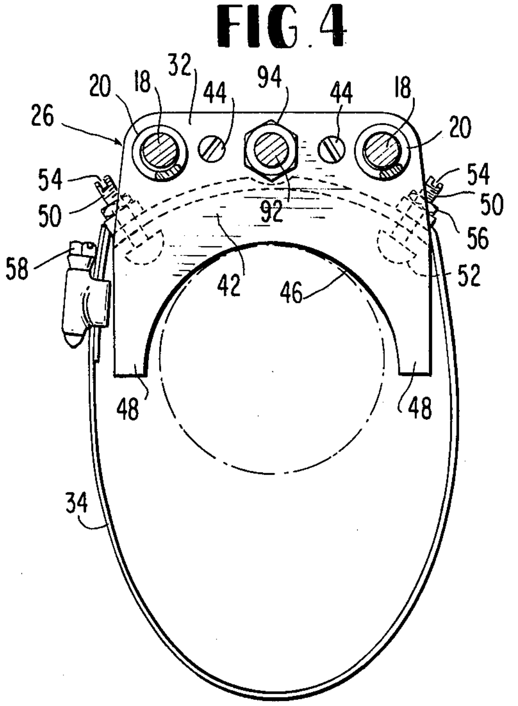
FIG. 4 is a sectional view taken on line 4—4 of FIG. 1.

Referring again to the shoe 14, it is seen that a large circular opening 70 is formed in the triangular toe section, with the opening being positioned so that the drill axis, when the drill is positioned on the guide, will pass through its center. A V-shaped groove 72 is formed in the bottom surface 16 of shoe 14, with the groove extending diametrically across the circular opening 70 and parallel to a plane containing the axis of guide rods 18. A plurality of threaded apertures 74, 76, 78, 80, 82, 84 and 86 are formed in and extend through the shoe 14 in a fixed pattern, with the apertures each being adapted to receive the threaded shaft of a screw member 88 having integrally molded on the head thereof a resilient, substantially cylindrical foot member 90. Three feet 90 are provided, with the feet being disposed on the shoe 14 in a triangular array as shown in FIGS. 3, 6A and 6B to support the drill guide and drill for drilling a hole normal to a flat surface.

When it is desired to drill a hole perpendicular to the axis of a small-diameter cylindrical element, the V-shaped notch 72 is placed in contact with the surface of the cylinder and the drill depressed against the force of resilient springs 20. Since the drill axis passes through the center of opening 70, the cylindrical article to be drilled will be aligned with its axis normal to the drill axis and retained in this position by the wedging action of the V-shaped notch during the drilling operation.

Figure 6A:
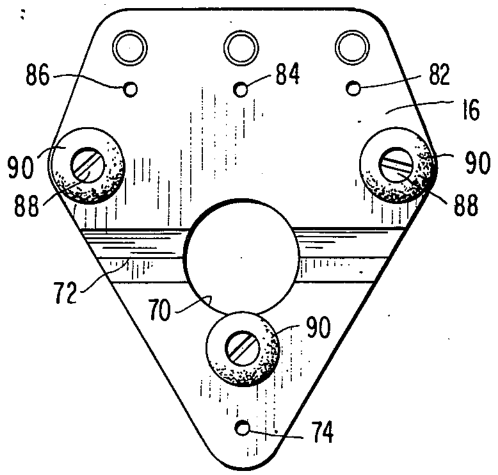
FIGS. 6A, 6B, and 6C are views similar to FIG. 3 and showing certain elements in alternate positions.
Figure 5:
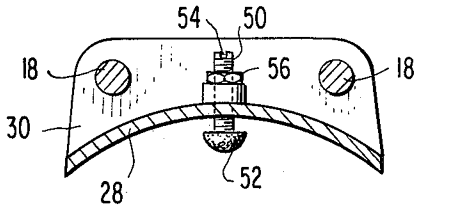
FIG. 5 is a sectional view taken on line 5—5 of FIG. 1.
Figure 6B:
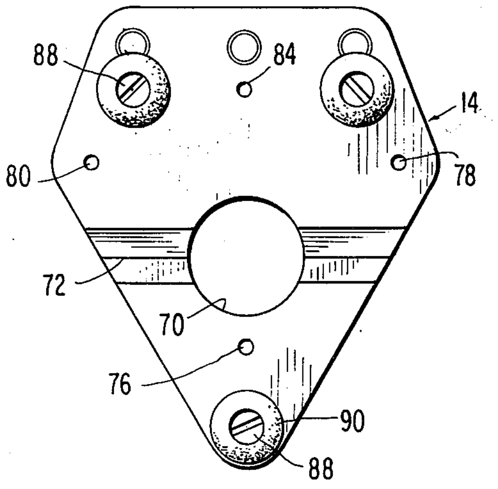
Figure 6C:
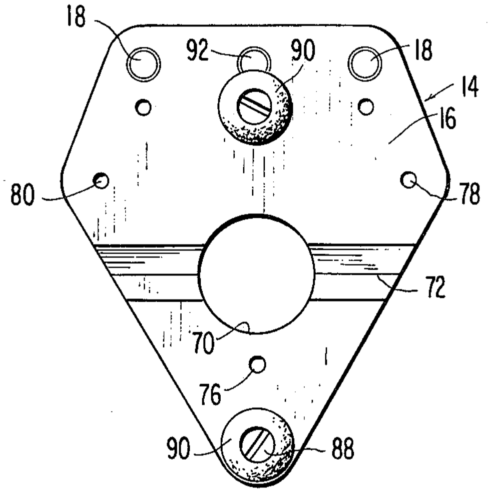

When it is desired to drill a hole normal to a compound curved surface such as in a spherical object, the feet 90 are arranged in the triangular arrangement of FIGS. 6A or 6B with the 3 feet 90 all being an equal distance from the drill axis, i.e., equal distance from the center of opening 70. By maintaining the drill guide with the three feet firmly in contact with the surface, the drill axis will automatically be oriented normal to the spherical surface.

When it is desired to drill a hole perpendicular to a cylindrical surface which has a radius too large for the drill guide to be stably supported against its surface by the V-shaped groove 72, the feet 90 are arranged in a triangular pattern with one foot nearest the toe or pointed end portion of the shoe in either the hole 74 or 76, and the remaining two feet being arranged in holes 78, 80 or 82, 86 which are equally distant from the axis of the V-shaped groove as the first foot. Thus, for an intermediate sized cylinder, the feet will be arranged in holes 76, 78 and 80 whereas for a larger cylindrical surface, the feet will be arranged in holes 74, 82 and 86. The feet are then placed into contact with the cylindrical surface and the two feet on the same side of the V-shaped groove are visually aligned with the axis of the cylinder to be drilled. The V-shaped notch may assist in visually aligning the device and it has been found that, although the three points themselves do not absolutely guarantee a hole perfectly normal to the axis of the cylinder, it is very easy to visually align the assembly so as to drill holes with surprising accuracy. In this regard, once in position, the contact of the three high-friction feet accurately hold the drill in the selected position so that there is no tendency for the drill to drift off the desired drill line during the drilling operation.

By using only two of the feet 90 mounted one in each of the holes 74 and 84, the drill guide can readily be employed to accurately drill holes on the centerline of narrow planar members such as strips, plate edges, or the like. This is accomplished by positioning one of the feet on each side of the member to be drilled and rotating the drill guide so that the two feet firmly engage the side edges of the member and with the surface 16 resting on the surface to be drilled. Since holes 74 and 84 are equal distance from the drill axis the drill axis will be located precisely on the centerline of the member to be drilled.

Mounted on the shoe 14 and projecting upwardly therefrom between and parallel to the two guide rods 18 is a threaded rod member 92. The free or upper end of rod 92 projects through an aperture in the bottom flange 32 when the saddle is in the raised position, and a nut 94 threaded on the shaft below flange 32 may be moved to any desired position along the shaft to engage the bottom of the flange to limit downward movement of the saddle 26 and the drill 12 carried thereby to limit the depth of penetration of a drill bit 96 into a workpiece. A second nut 98 threaded onto the rod 92 above the flange 34 may be turned down onto the shaft to hold the drill in a position compressing the springs 20 when desired. Thus, the nuts 98 and 94 may be employed to clamp flange 32 thereby holding the saddle 22 and drill against relative movement toward and away from shoe 14. In this position, with the drill bit 96 projecting below the bottom surface 16 of shoe 14, and with all the feet 90 removed, the assembly may be employed as a router, edge sander, or the like.

From the above, it is seen that the drill guide according to the present invention may be attached to various sized commercially available hand drills of different structural configuration, and is therefore highly versatile in its application. To attach the guide, the drill is telescoped through the loosened hose clamp 34 and the end of the housing positioned on the index plate 46 with the yoke-like arms 48 of the index plate extending along each side of the drill shaft. The hose clamp is then tightened to lightly press the housing of the drill against the resilient pads 52 on the adjusting screws 50. Thereafter, the adjusting screws are adjusted, tightening or loosening the hose clamp as necessary, to provide firm, three-point support between the housing and the saddle and to accurately align the axis of the drill bit with the center of the opening 70. With the adjusting screws and hose clamp firmly tightened, and with the end of the drill housing resting on the index plate, the drill and drill guide are rigidly assembled and ready for use.

While I have disclosed and described a preferred embodiment of my invention, I wish it understood that I do not intend to be restricted solely thereto, but rather that I intend to include all embodiments thereof which would be apparent to one skilled in the art and which come within the spirit and scope of my invention.

I claim:

1. In a universal drill guide assembly for use with hand-held power drills, comprising, in combination, a base having a pair of parallel laterally spaced guide rods projecting from one surface thereof, a drill support assembly adapted to be releasably mounted on a drill housing, such drill support assembly being moveably mounted on the guide rods to support the drill for movement toward and away from the base, spring means normally urging the drill support assembly away from the base, the base including a plate member having a central opening therethrough through which the bit of a drill may pass when the drill guide is mounted on a drill, the plate member having a flat surface on the side opposite the guide rods and extending perpendicular to the axis of the guide rods, a plurality of bores formed in the base from the flat surface, the bores being disposed in a predetermined pattern relative to the opening and to the axis of the guide rods, and a plurality of feet mounted one in each of at least selected ones of the bores and projecting outwardly from the flat surface, each of the feet including mounting means adapted to be releasably retained in one of the bores and a generally cylindrical body portion projecting outwardly from the flat surface, the body portions being of substantially equal length and diameter, whereby the feet may be arranged in predetermined patterns on the flat surface to adapt the guide for different drilling operations.

2. In the drill guide assembly as defined in claim 1, the further improvement comprising a V-shaped groove formed in the flat surface and extending completely thereacross and diametrically across the opening in the base plate along a line parallel to a plane containing the axes of the guide rods.

3. The drill guide assembly as defined in claim 2 wherein the bores each comprise a threaded bore, and the mounting means on the feet comprise a threaded screw member adapted to be received in the bores.

4. The drill guide assembly as defined in claim 3 wherein the body portions of the feet are formed of a resilient high-friction rubber-like material.

5. The drill guide assembly as defined in claim 4 wherein the plate member has converging side edges in the area adjacent the opening, the converging side edges meeting at a point spaced equal distance from the guide rods.

6. The drill guide assembly as defined in claim 5 further comprising means on the drill support assembly for adjusting the position of a drill mounted therein to accurately align the drill axis with the center of the opening in the plate member.

7. The drill guide assembly as defined in claim 3 wherein the bores are arranged in a pattern permitting the location of three of the feet to be mounted thereon at equal distances from the center of the central opening.

8. The drill guide assembly as defined in claim 7 wherein the pattern also permits arrangement of three of the feet on the base at equal distances from a first line through the center of the central opening perpendicular to the drill axis and extending parallel to a plane containing the axis of the pair of guide rods.

9. The drill guide assembly as defined in claim 8 wherein the pattern permits arrangement of two of the feet on the base at equal distances from the center of the central opening and along a line through the center of the central opening and perpendicular to the plane of the guide rods.

10. The invention as defined in claim 1 further comprising drill depth-limiting means mounted on the base and engagable with the drill support assembly for limiting movement of the drill support toward the base, the depth-limiting means including an elongated bar member disposed between and extending parallel to the guide rods, screw threads formed on the elongated bar member, and an adjustable stop member threadably mounted on the elongated bar in position to engage the drill support assembly, the stop member being adjustable along the screw threads to thereby vary the limit of movement of the drill support assembly.

11. The invention as defined in claim 10 wherein the drill support comprises a flange member having an opening therethrough telescopingly receiving the elongated bar member with the adjustable stop being mounted on the bar between the flange and the base, and wherein the drill depth-limiting means includes a fastener threadably mounted on and movable along the elongated bar on the side of the flange opposite the stop member whereby the stop member and fastener may rigidly clamp the flange to lock the drill support assembly in a fixed position relative to the base.

12. The invention as defined in claim 11 wherein the drill support assembly includes a plate member extending generally parallel to the guide rods, means supporting the plate member for movement along the guide rods, and a plurality of adjustable spacer members mounted on and projecting outwardly from one surface of the plate member for engaging the housing of a power drill, and clamp means for releasably clamping a drill into firm contact with the adjustable spacers, the spacers being adjustable to align the drill with the opening in the base.

* * * * *